(12) United States Patent
Cheng et al.

(10) Patent No.: US 10,384,740 B1
(45) Date of Patent: Aug. 20, 2019

(54) OPENING CONTROL STRUCTURE OF ELECTRIC VEHICLE BATTERY BOX

(71) Applicant: KWANG YANG MOTOR CO., LTD., Kaohsiung (TW)

(72) Inventors: Jen-Chieh Cheng, Kaohsiung (TW); Hsin-Liang Teng, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 16/247,581

(22) Filed: Jan. 15, 2019

(30) Foreign Application Priority Data

Feb. 2, 2018 (TW) .............................. 107103811 A

(51) Int. Cl.
| | | |
|---|---|---|
| *B60K 1/04* | (2019.01) | |
| *B62K 19/40* | (2006.01) | |
| *B62H 5/00* | (2006.01) | |
| *B62J 99/00* | (2009.01) | |
| *E05B 81/16* | (2014.01) | |
| *E05B 79/20* | (2014.01) | |

(52) U.S. Cl.
CPC .............. *B62K 19/40* (2013.01); *B62H 5/001* (2013.01); *B62J 99/00* (2013.01); *E05B 79/20* (2013.01); *E05B 81/16* (2013.01); *B62J 2099/002* (2013.01); *B62J 2099/004* (2013.01); *B62K 2202/00* (2013.01); *B62K 2204/00* (2013.01)

(58) Field of Classification Search
CPC .................. B60K 1/04; B60K 2202/00; B60K 2001/0488; B60K 2001/0416; B60L 50/64; B60L 50/66; B60R 25/40; H01M 2/1083
See application file for complete search history.

(56) References Cited

U.S. PATENT DOCUMENTS

| | | | | |
|---|---|---|---|---|
| 5,207,288 A | * | 5/1993 | Ono | B62M 7/12 180/220 |
| 5,613,569 A | * | 3/1997 | Sugioka | B60R 16/04 180/68.5 |
| 6,722,460 B2 | * | 4/2004 | Yang | B62M 7/12 180/220 |
| 7,249,644 B2 | * | 7/2007 | Honda | B60K 1/00 180/65.51 |
| 8,590,656 B2 | * | 11/2013 | Tsai | B62K 19/30 180/219 |
| 2012/0000720 A1 | * | 1/2012 | Honda | B62K 11/10 180/65.1 |
| 2014/0078249 A1 | * | 3/2014 | Wang | H04N 19/597 348/43 |

* cited by examiner

*Primary Examiner* — James A Shriver, II
*Assistant Examiner* — James J Triggs
(74) *Attorney, Agent, or Firm* — Leong C. Lei

(57) ABSTRACT

An opening control structure of an electric vehicle battery box is provided. An electric vehicle at least includes a frame unit and a vehicle body cover unit that covers the frame unit. The frame unit shaft-supports a battery box thereon. The battery box receives and holds therein a battery that supplies electrical power for driving the electric vehicle. The battery box is provided with an operation device that sets the battery box at an open position or a storage position. The operation device is electrically connected to an operation controller. The operation controller is electrically connected with a verifying unit. The verifying unit is put into operation by a to-be-verified unit or through sensing. As such, easiness of lifting and removing a battery and burglarproofness are improved.

14 Claims, 17 Drawing Sheets

OPENING CONTROL STRUCTURE OF ELECTRIC VEHICLE BATTERY BOX

(a) TECHNICAL FIELD OF THE INVENTION

The present invention generally relates to an opening control structure of an electric vehicle battery box, and more particularly to an opening control structure of a battery box of an electric vehicle that improves easiness of locking and removal operations and burglarproofness of the battery box.

(b) DESCRIPTION OF THE PRIOR ART

An electric vehicle 1 is provided with a receiving space 12 under a tread board 11 that is arranged for supporting user's feet to rest thereon. As shown in FIG. 1, the receiving space 12 receives and holds therein a battery 13 that supplies electrical power source to the electric vehicle 1. The battery 13 is received and stored in a battery box 14.

As shown in FIG. 2, to make the battery 13 burglarproof, manufacturers have proposed an electric vehicle in TWI533150 patent. The electric vehicle patent of TWI533150 generally provides a tread board 11 having an end pivotally mounted and an opposite end provided with a lock 15. Locking achieved with the lock 15 prevents the tread board 11 from being readily lifted open, so as to offer easy burglarproofness as being received and stored in the receiving space 12.

Although storage of the battery 13 as provided in the above known electric vehicle 1 provides the battery 13 with storage easiness and easy burglarproofness, since the lock 15 is arranged at an end of the tread board 11, the lock 15 may be easily contaminated as being treaded by a user and may also be stained by external dust. On the one hand, the lock 15 may be readily soiled and damaged and become hard to unlock and a user may get the soil attached in opening the lock 15, and on the other hand, the lock 15, being a simply structured lock that is exposed, may be of insufficiency in burglarproofness. Further, in the above known electric vehicle 1, with the battery 13 being received and held in position, when it is desired to remove the battery 13 from the battery box 14 for charging or maintenance, an operation of removing the battery 13 from the battery box 14 is very inconvenient.

Thus, it is a challenge of the electric vehicle industry to provide an opening control structure of an electric vehicle battery box that helps improve withdrawal easiness and burglarproofness of a battery of an electric vehicle.

SUMMARY OF THE INVENTION

The primary objective of the present invention is to provide an opening control structure of an electric vehicle battery box, which helps overcome the drawbacks of a conventional electric vehicle in respect of inconvenience of operation for locking and lifting and removing of a battery box and poor burglarproofness.

For such a purpose, the primary technical solution of the present invention as proposed in claim 1 is to provide an opening control structure of an electric vehicle battery box, wherein an electric vehicle at least comprises a frame unit and a vehicle body cover unit that covers the frame unit; the frame unit shaft-supports a battery box thereon, the battery box receiving and holding therein a battery that supplies electrical power for driving the electric vehicle, wherein the battery box is provided with an operation device that sets the battery box at an open position or a storage position; the operation device is electrically connected to an operation controller, the operation controller being electrically connected with a verifying unit, the verifying unit being put into operation by a to-be-verified unit or through sensing.

For such a purpose, the primary technical solution of the present invention as proposed in claim 2 is to provide an opening control structure of an electric vehicle battery box, wherein the frame unit is provided with a locking device for locking and securing the battery box; the locking device is connected via a control cable to an electro-mechanical controller and an electrical signal cable electrically connects the electro-mechanical controller to the operation controller, so that the operation controller controls the locking device to carry out a locking operation or a locking release operation; and the battery box is provided with a positioning member corresponding to the locking device.

For such a purpose, the primary technical solution of the present invention as proposed in claim 3 is to provide an opening control structure of an electric vehicle battery box, wherein the to-be-verified unit comprises one of a key, a key with sensing chip, and a sensor.

For such a purpose, the primary technical solution of the present invention as proposed in claim 4 is to provide an opening control structure of an electric vehicle battery box, wherein the verifying unit comprises one of a main switch lock, a main switch lock with sensing device, and a sensing reader.

For such a purpose, the primary technical solution of the present invention as proposed in claim 5 is to provide an opening control structure of an electric vehicle battery box, wherein the operation controller is further electrically connected with a trigger unit.

For such a purpose, the primary technical solution of the present invention as proposed in claim 6 is to provide an opening control structure of an electric vehicle battery box, wherein the trigger unit comprises a push button or a toggle switching member.

For such a purpose, the primary technical solution of the present invention as proposed in claim 7 is to provide an opening control structure of an electric vehicle battery box, wherein the sensor comprises at least one of an electromagnetic wave sensor, an optic wave sensor, a sound wave sensor, and a magnetic sensor.

For such a purpose, the primary technical solution of the present invention as proposed in claim 8 is to provide an opening control structure of an electric vehicle battery box, wherein the frame unit comprises side frame tubes extending toward a rear side of a vehicle body, the side frame tubes comprising riser frame sections and rear frame sections, a transverse tube being provided on the riser frame sections, the locking device being arranged on the transverse tube, the positioning member being provided at a location closer to the rear side of the vehicle body than support shafts of the battery box and located adjacent to the locking device when the battery box is set at the storage position and being set at a height in a condition that the battery box is at the open position lower than that of the storage position.

For such a purpose, the primary technical solution of the present invention as proposed in claim 9 is to provide an opening control structure of an electric vehicle battery box, wherein the operation device is electrically connected via an electrical signal cable to the operation controller.

For such a purpose, the primary technical solution of the present invention as proposed in claim 10 is to provide an opening control structure of an electric vehicle battery box, wherein the operation device comprises an electrically-driven motor and a worm-and-worm gear based reduction mechanism driven by the electrically-driven motor.

For such a purpose, the primary technical solution of the present invention as proposed in claim 11 is to provide an opening control structure of an electric vehicle battery box, wherein the verifying unit and the to-be-verified unit are a near field sensing device; and the near field sensing device comprises a to-be-verified section and a verifying section, the to-be-verified section being provided on the battery, the verifying section being arranged on a vehicle body of the electric vehicle.

The efficacy that the primary technical solution of the present invention proposed in claim 1 may achieve is that easiness of lifting and removing a battery is improved and burglarproofness of the battery is enhanced.

The efficacy that the primary technical solution of the present invention proposed in claim 2 may achieve is that an effect of locking and positioning of a battery box is ensured and burglarproofness of a battery and controllability of a locking device are enhanced.

The efficacy that the primary technical solution of the present invention proposed in claim 3 may achieve is that sensing and controllability of a to-be-verified unit are ensured.

The efficacy that the primary technical solution of the present invention proposed in claim 4 may achieve is that sensing and controllability of a verifying unit are improved.

The efficacy that the primary technical solution of the present invention proposed in claim 5 may achieve is that controllability of opening and closing of a battery box is enhanced.

The efficacy that the primary technical solution of the present invention proposed in claim 6 may achieve is that operability of a trigger unit is improved.

The efficacy that the primary technical solution of the present invention proposed in claim 7 may achieve is that operability of a sensor is improved.

The efficacy that the primary technical solution of the present invention proposed in claim 8 may achieve is that, on the one hand, easiness of arrangement of a locking device and a positioning member is improved and a space of an electric vehicle is fully utilized, and on the other hand, the positioning member is hidden when a battery box is at the open position, without interfering with the site where a battery is lifted and removed from the battery box.

The efficacy that the primary technical solution of the present invention proposed in claim 9 may achieve is that controllability of an operation device is improved.

The efficacy that the primary technical solution of the present invention proposed in claim 10 may achieve is that controllability of an operation device is improved and open and storage positions of a battery box are ensured.

The efficacy that the primary technical solution of the present invention proposed in claim 11 may achieve is that easiness of lifting and removing a battery is improved and burglarproofness of the battery is enhanced.

DETAILED DESCRIPTION OF THE PREFERRED EMBODIMENTS

Figure 1:
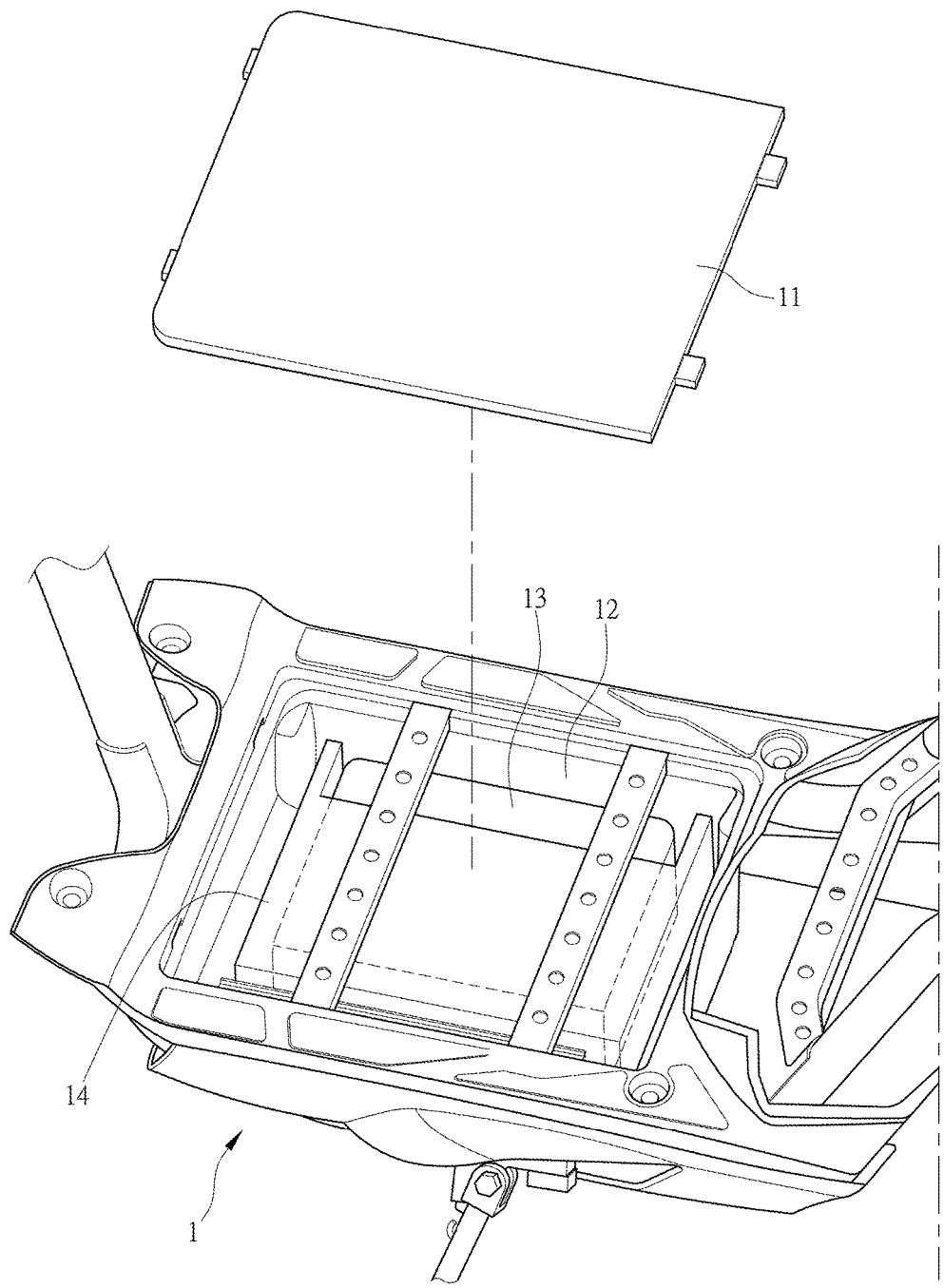
FIG. 1 is a schematic view illustrating a conventional electric vehicle battery box.
Figure 2:
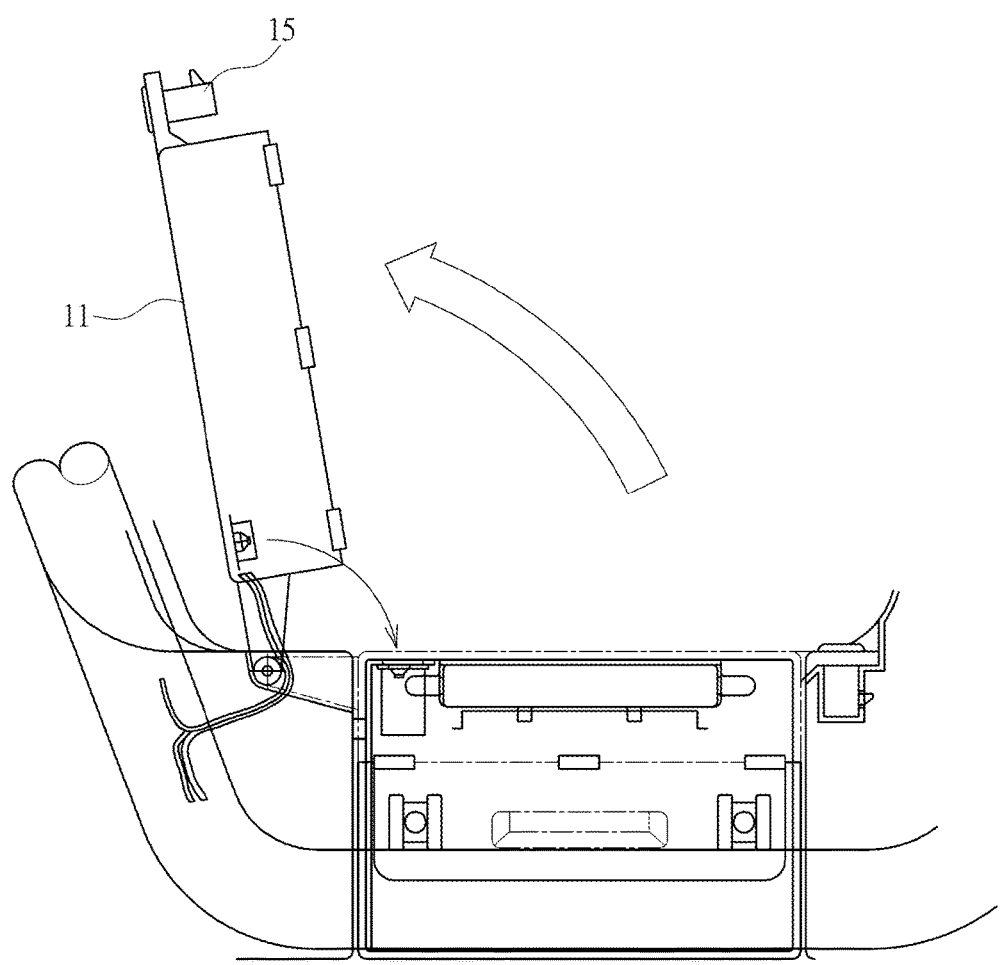
FIG. 2 illustrates the prior art patent of TW533150.
Figure 3:
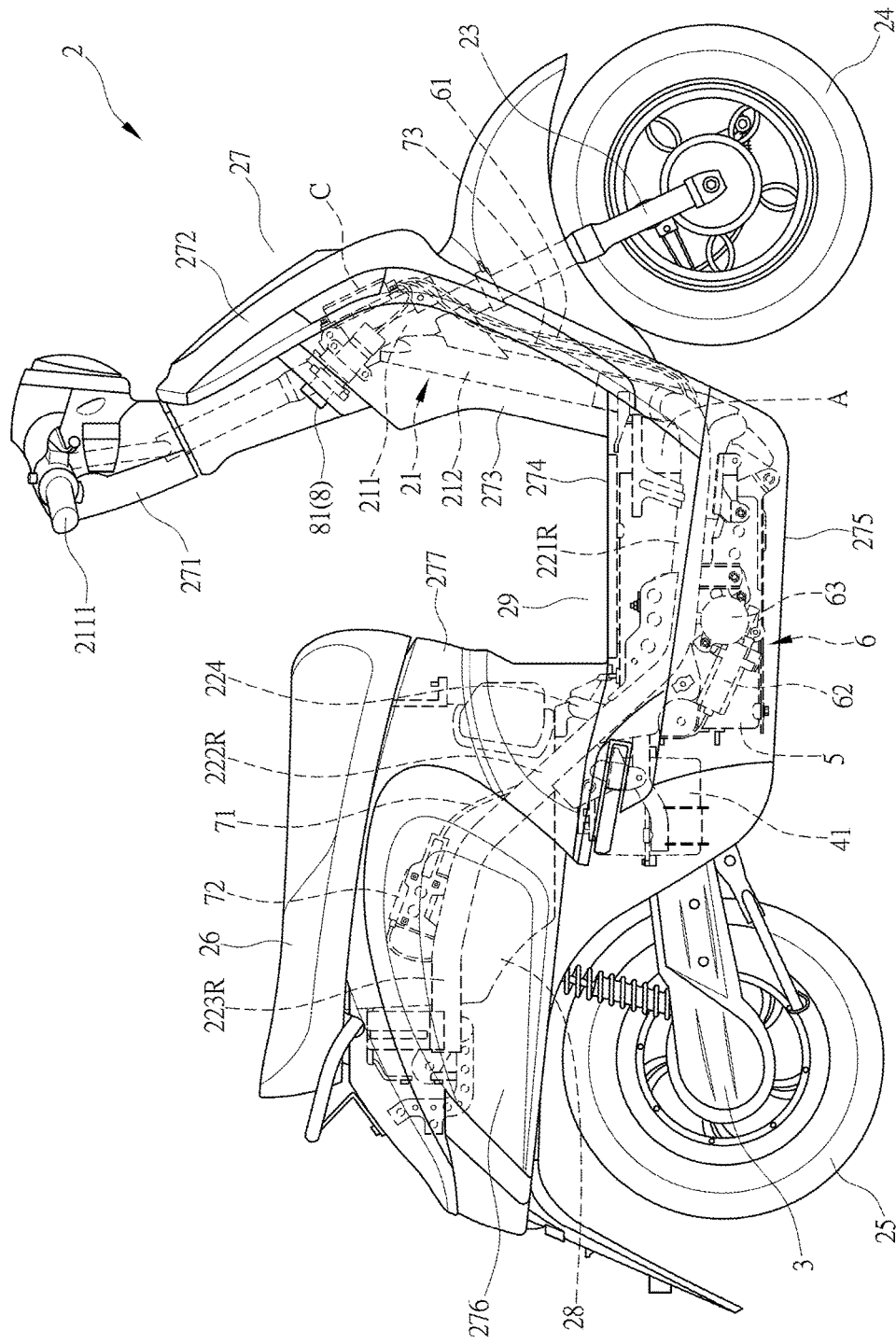
FIG. 3 is a side elevational view illustrating an electric vehicle according to the present invention.
Figure 4:
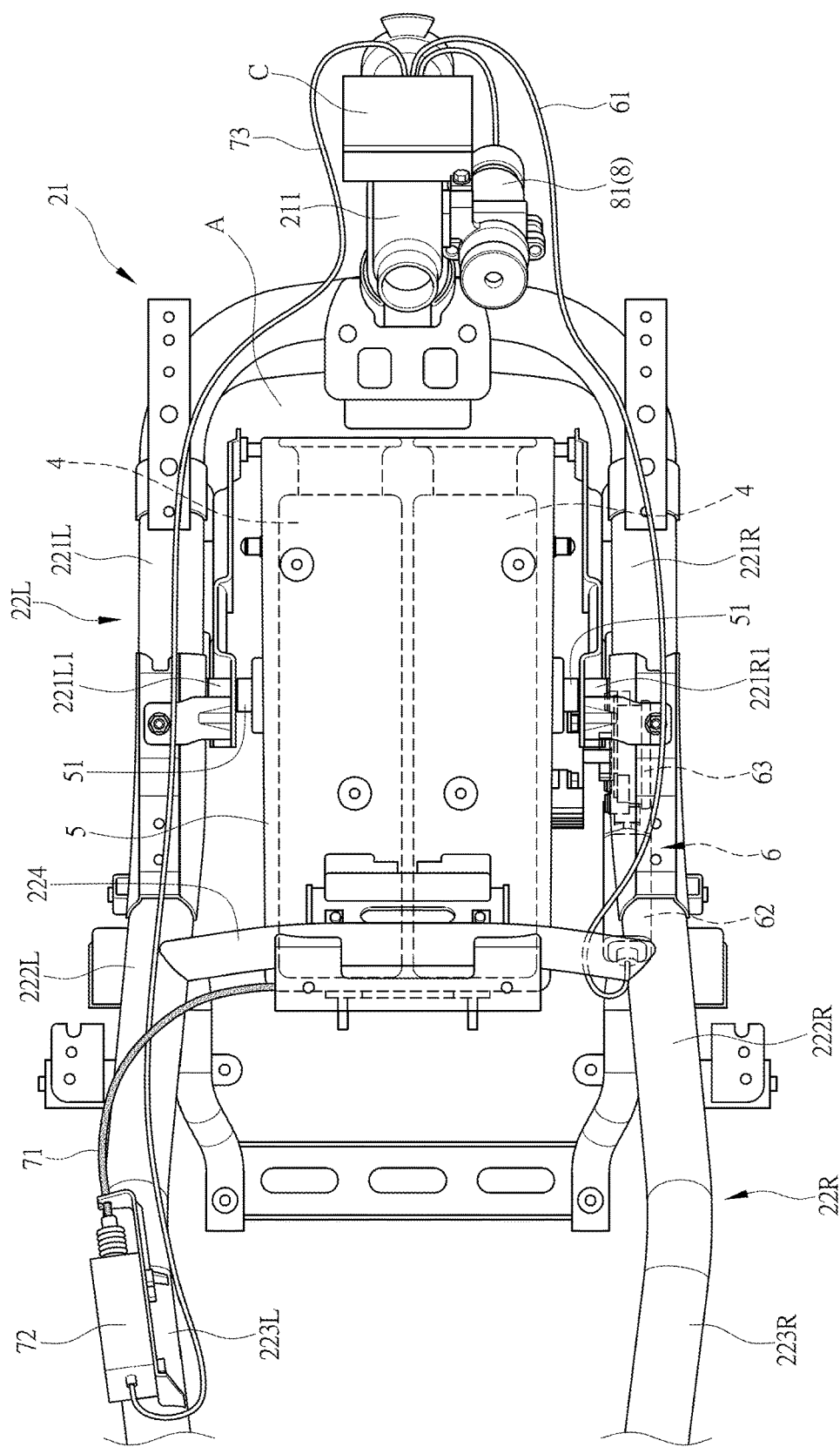
FIG. 4 is a top plan view illustrating an arrangement of a battery box of the electric vehicle according to the present invention.

Firstly, referring to FIGS. 3 and 4, the present invention provides an opening control structure of an electric vehicle battery box. A frame unit 21 of an electric vehicle 2 is provided with a head tube 211. The head tube 211 is provided, at an upper side thereof, with a steering mechanism 2111. The steering mechanism 2111 is connected, at a lower side thereof, to a front fork unit (a front shock absorber) 23. The front fork unit 23 is provided, at a lower side thereof and in a rotatable manner, with a front wheel 24. The frame unit 21 comprises a main tube 212 extending downward from the head tube 211 in a direction toward a rear side of a vehicle body. The main tube 212 is provided, as being further extended toward the rear side of the vehicle body, with side frame tubes 22L, 22R that are arranged pairwise in left and right sides. The side frame tubes 22L, 22R comprise tread tube sections 221L, 221R that are arranged pairwise in left and right sides and are adjacent to the main tube 212, riser frame sections 222L, 222R that are arranged pairwise in left and right sides and extend upward from the tread tube sections 221L, 221R in a direction toward the rear side of the vehicle body, and rear frame sections 223L, 223R that extend from the riser frame sections 222L, 222R in a direction toward the rear side of the vehicle body and are arranged pairwise in left and right sides. A transverse tube 224 is arranged between the riser frame sections 222L, 222R. A rear wheel 25 is arranged rearward of and under the rear frame sections 223L, 223R. A driving motor 3 is arranged at one side of the rear wheel 25 and the driving motor 3 drives the rear wheel 25 in order to cause the electric vehicle 2 to move forward. A seat section 26 is arranged rearward of the steering mechanism 2111 and located above the rear wheel 25 and a spacing distance is provided between the seat section 26 and the steering mechanism 2111. The electric vehicle 2 is provided, on an outside thereof, with a vehicle body cover unit 27. The vehicle body cover unit 27 comprises a head cover 271 housing the steering mechanism 2111, a front head cover 272 arranged at a lower side of the head cover 271 and housing a front end of the vehicle body, and a knee-shielding cover 273 arranged at a rear side of the front head cover 272. A tread board 274 is arranged between the steering mechanism 2111 and the seat section 26 at a lower side thereof. A bottom cover 275 is arranged at a lower side of the tread board 274. The electric vehicle 2 is provided, on two sides thereof, with side vehicle body covers 276 at a lower side of the seat section 26. A central vehicle body cover 277 is provided at a lower side of a front end of the seat section 26. An article storage box 28 is provided under the seat section 26 and an upper side of the article storage box 28 is shielded by the seat section 26. The electric vehicle 2 is provided with a power source, of which an example that is shown in the drawings includes a driving motor 3 driving the rear wheel 25. In practice, the electric vehicle 2 of the present invention can alternatively provided with a frontward-arranged motor that drives, by means of a chain or a belt, the rear wheel 25, or a driving mechanism that is made up of a motor and a transmission box to drive the rear wheel 25. It is noted here that the present invention is not limited to the specific way of driving the rear wheel 25 with the driving motor 3.

As shown in FIGS. 3 and 4, the tread board 274 forms a foot support section 29, and the foot support section 29 functions to receive a rider's feet to place thereon. The tread board 274, the bottom cover 275, and the left tread tube section 221L and the right tread tube section 221R define a receiving space A. The receiving space A receives therein a battery box 5, and the battery box 5 functions to receive and hold therein a battery 4. The battery 4 is electrically connected with the driving motor 3, in order to provide electrical power to the driving motor 3 to drive the rear wheel 25 to rotate. As such, a control device (not shown in the drawings) provided on the steering mechanism 2111 can be operated to activate the driving motor 3 to drive the rear wheel 25 to rotate so as to cause the electric vehicle 2 to move.

Figure 5:
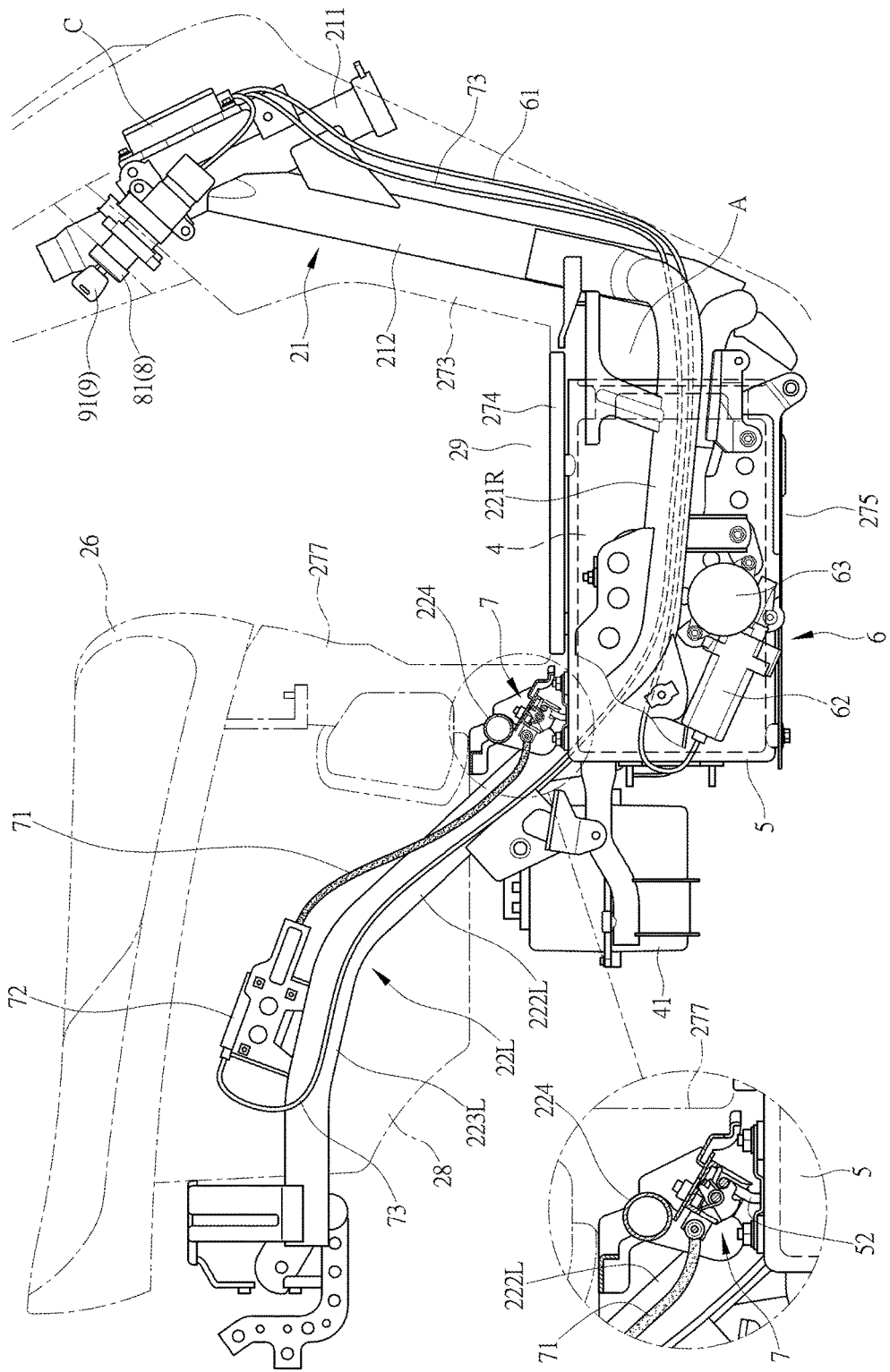
FIGS. 5 and 6 illustrate a first embodiment of opening the battery box of the electric vehicle according to the present invention.

As shown in FIGS. 3, 4, and 5, the battery box 5 is received in the receiving space A defined by the tread board 274, the bottom cover 275, the left tread tube section 221L and the right tread tube section 221R in a manner of being arranged in a vehicle body front-rear direction of the electric vehicle 2. The left tread tube section 221L is provided with a left shaft support section 221L1, and the right tread tube section 221R is provided with a right shaft support section 221R1. Speaking more specifically, the battery box 5 is provided, on two opposite sides thereof, with support shafts 51 projecting therefrom in a vehicle body left-right direction. The support shafts 51 that are arranged on the two sides of the battery box 5 are arranged above a battery box center axis of the battery box 5 that extends in the vehicle body front-rear direction. As such, the battery box 5 is shaft-supported by the support shafts 51 in the vehicle body left-right direction on the left shaft support section 221L1 of the left tread tube section 221L and the right shaft support section 221R1 of the right tread tube section 221R. An upper surface of the battery box 5 is fixed to the tread board 274, and a lower surface of the battery box 5 is fixed to the bottom cover 275. One side of the battery box 5 is provided with an operation device 6, and the operation device 6 comprises an electrically-driven motor 62 and a worm-and-worm gear based reduction mechanism 63 driven by the electrically-driven motor 62.

As shown in FIGS. 3, 4, and 5, an electrical power source of the operation device 6 is supplied with a second battery 42 arranged at a lower side of a front portion of the article storage box 28. Further, the steering mechanism 2111 is provided with an operation controller C that controls operation of the operation device 6. The operation device 6 is electrically connected, through an electrical signal line 61, to the operation controller C, so that the operation controller C can be operated to put the operation device 6 into operation for causing the battery box 5 to rotate, about a rotation center defined by the support shafts 51, toward the vehicle body front-rear direction, to an open position or a storage position in order to be opened in a condition of generally defining a right angle with respect to a ground surface, thereby allowing a vehicle operator to withdraw and remove the battery 4 from the battery box 5. The operation device 6 can be arranged at the left side or the right side of the battery box 5, and in other words, the operation device 6 can be arranged on the left tread tube section 221L or the right tread tube section 221R. Being arranged on the right tread tube section 221R as shown in the instant embodiment is taken as an example for illustration of the present invention; however, this invention is not limited to such an embodiment.

As shown in FIGS. 4, 5, 6, and 7, the battery box 5 is provided on an external upper surface thereof with a positioning member 52 facing a rear side of the vehicle body. The positioning member 52 is arranged on the external upper surface of the battery box 5 at a location closer to the rear side of the vehicle body than the support shafts 51 of the battery box 51 and is located adjacent to a locking device 7 when the battery box 5 is set at the storage position, and is set at a height in a condition that the battery box 5 is at the open position lower than that of the storage position, so that, on the one hand, easiness of arrangement of the locking device 7 and the positioning member 52 can be improved and a space of the electric vehicle 2 can be fully utilized, and on the other hand, the positioning member 52 can be hidden when the battery box 5 is at the open position, without interfering with the site where the battery 4 is lifted and removed from the battery box 5. The locking device 7 is provided on the transverse tube 224 between the riser frame sections 222L, 222R of the frame unit 21. The locking device 7 is arranged on the transverse tube 224 in a manner of slightly inclining downward in a direction toward a frontward direction of the vehicle body and the battery box 5. The locking device 7 is operable to hook on and lock to the positioning member 52 of the battery box 5 so as to provide the battery box 5 with an effect of locking and positioning in a condition of being received and stored. The locking device 7 is connected, through a control cable 71, to an electro-mechanical controller 72 and a signal cable 73 is used to electrically connect the electro-mechanical controller 72 to the operation controller C so that the operation controller C may make the locking device 7 to release locking of storage of the battery box 5.

Figure 6:
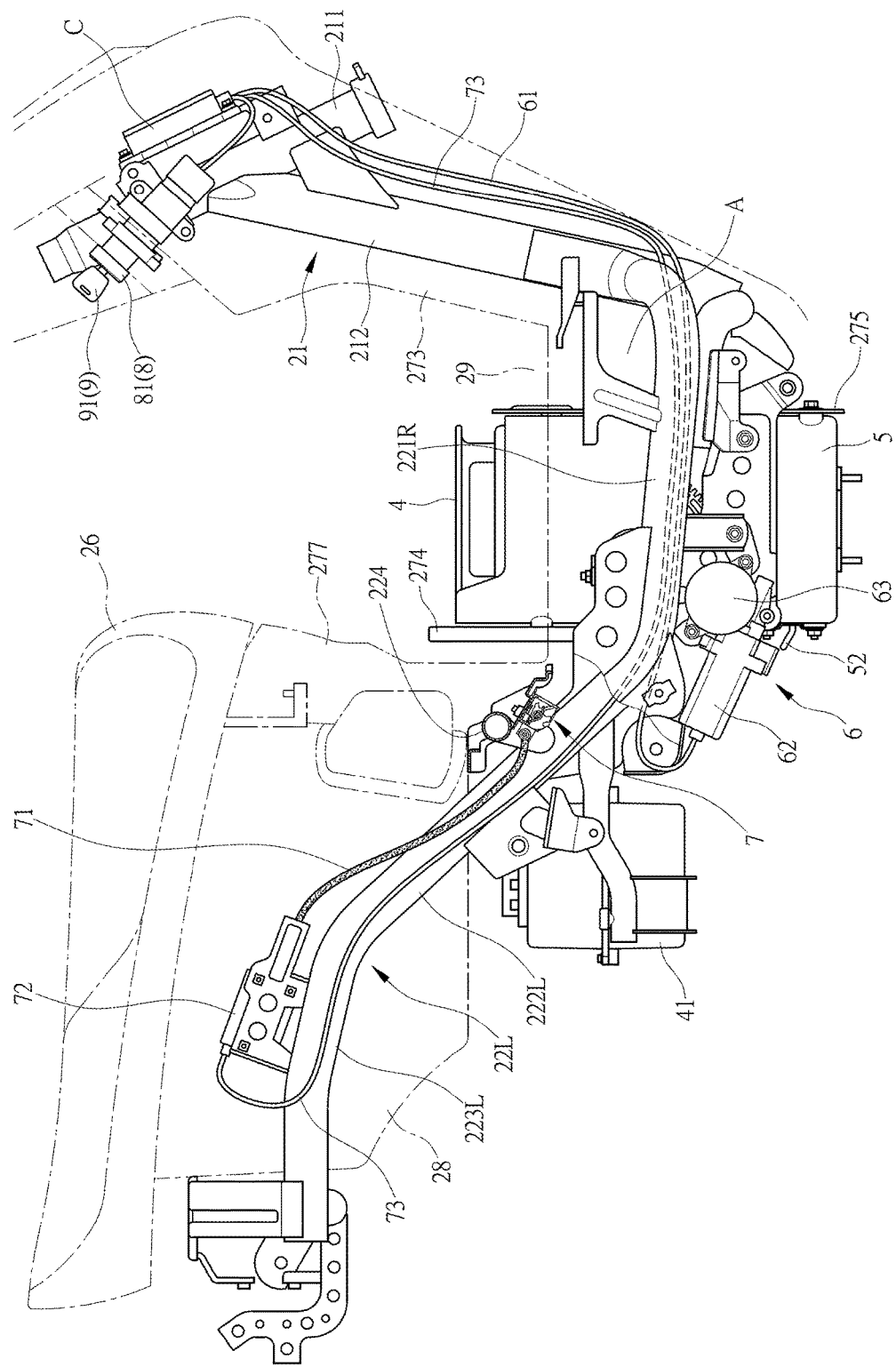
Figure 7:
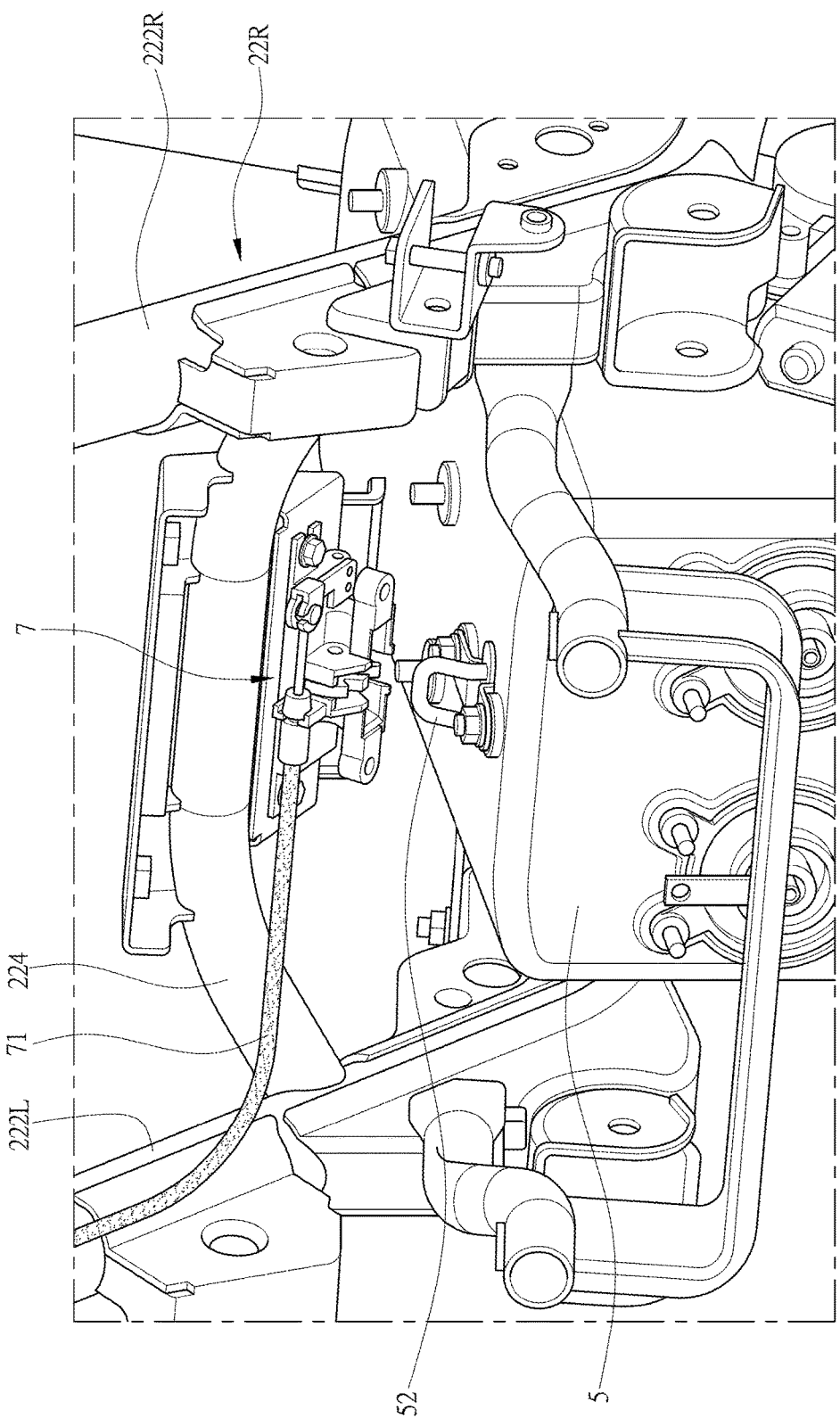
FIG. 7 is a rear view, in a schematic form, illustrating a positioning member and a locking device of the battery box according to the present invention.

As shown in FIGS. 5, 6, and 7, in reduction of the present invention into practice, the operation controller C is electrically connected to a verifying unit 8, and the verifying unit 8 is constrained by a to-be-verified unit 9. In other words, the to-be-verified unit 9 allows the verifying unit 8 to get in conduction with the operation controller C so that the verifying unit 8 is operable to drive or not drive the operation controller C. In a first embodiment of the present invention, the verifying unit 8 is embodied as a main switch lock 81, while the to-be-verified unit 9 is embodied as a key 91. When the key 91 of the to-be-verified unit 9 matches the main switch lock 81 of the verifying unit 8, the key 91 may rotate the main switch lock 81 so that the main switch lock 81 may set the operation controller C in operation to first cause the locking device 7 to release locking of storage of the battery box 5, and then causing the operation device 6 to operate for making the battery box 5 to rotate about the rotation center defined by the support shafts 51 to the open position of being generally defining a right angle with respect to the ground surface, whereby a user is allowed to readily lift and remove the battery 4 from the battery box 5.

Figure 8:
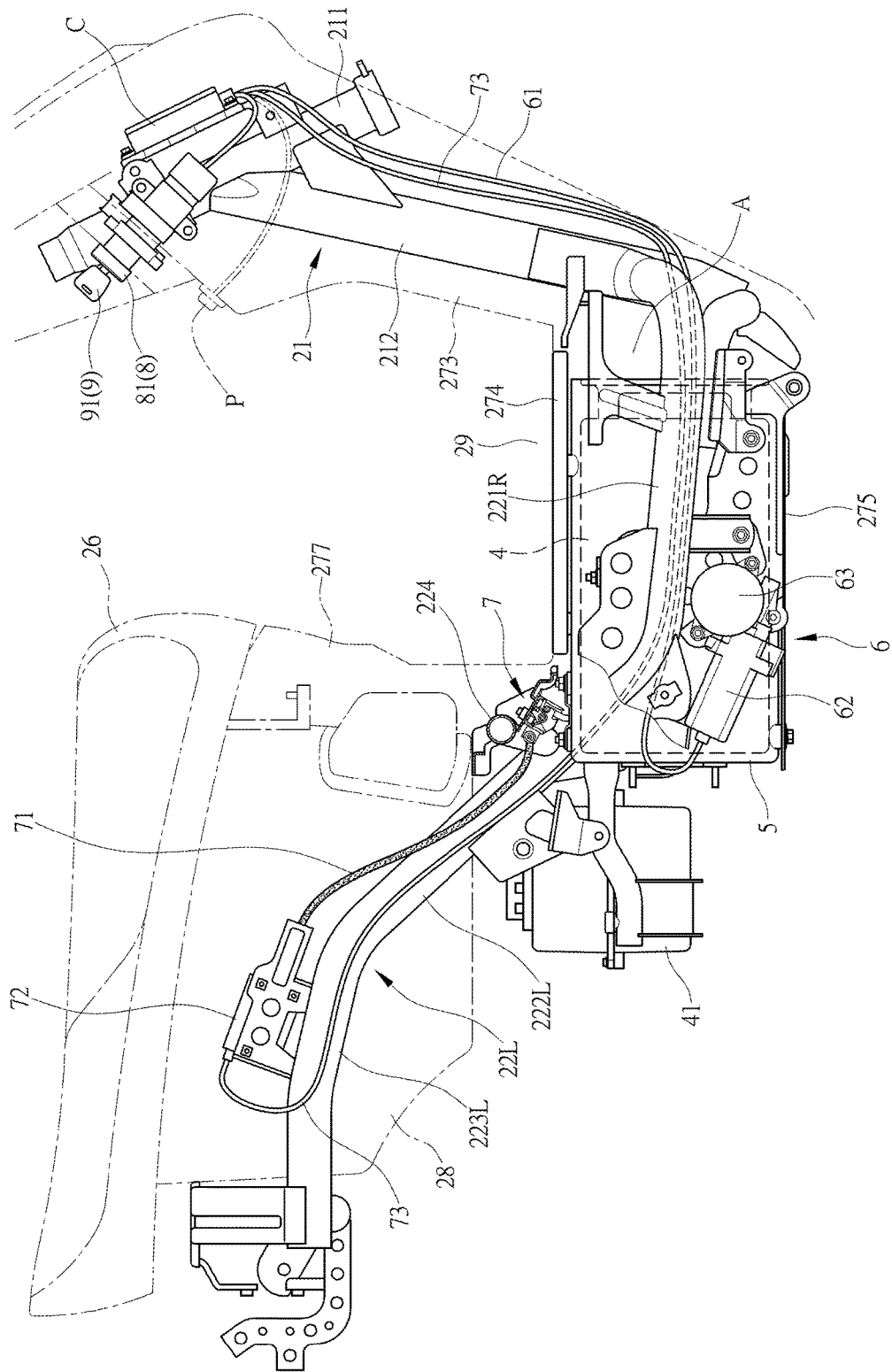
FIGS. 8 and 9 illustrate a second embodiment of opening the battery box of the electric vehicle according to the present invention.
Figure 9:
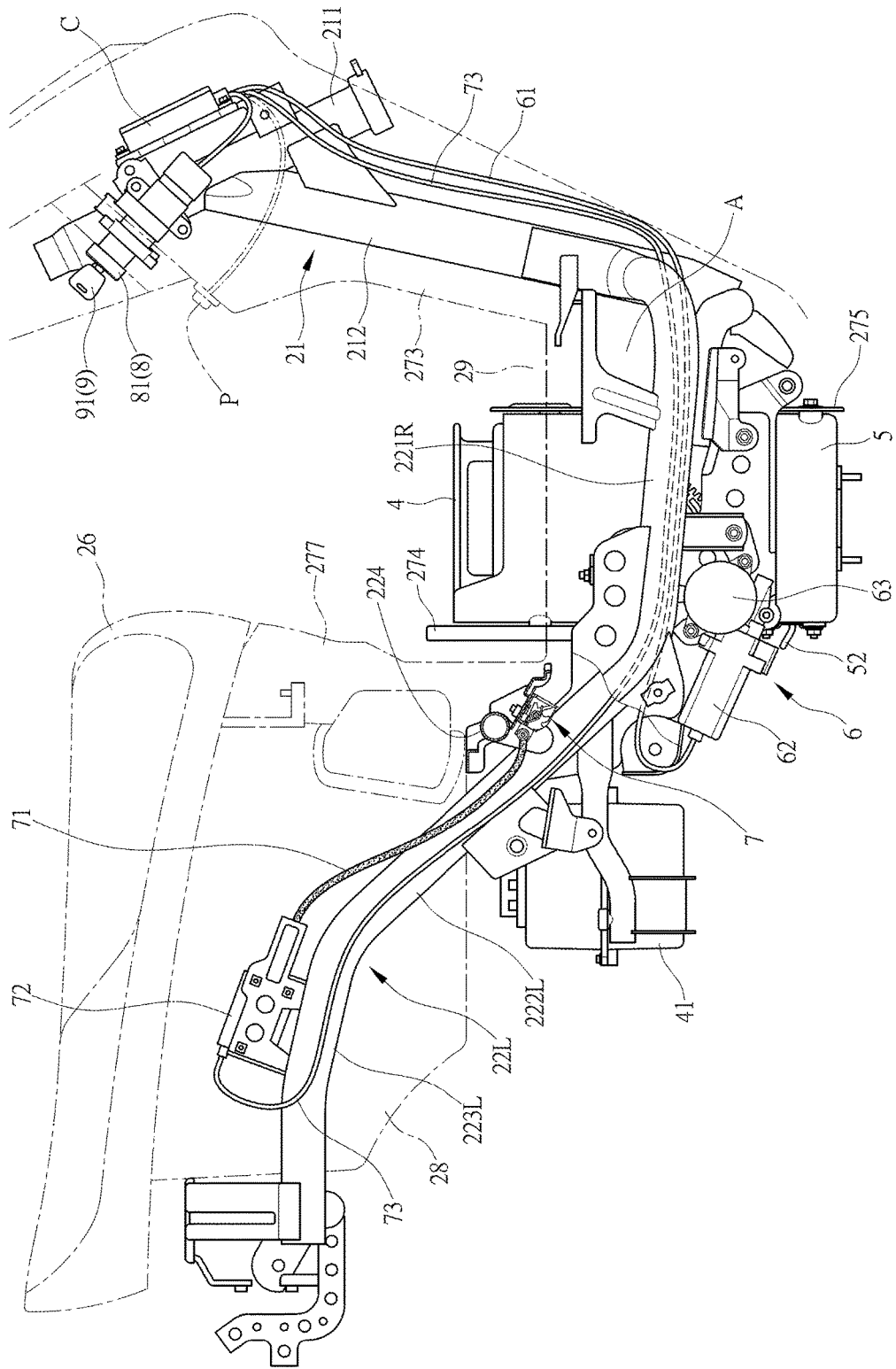
Figure 10:
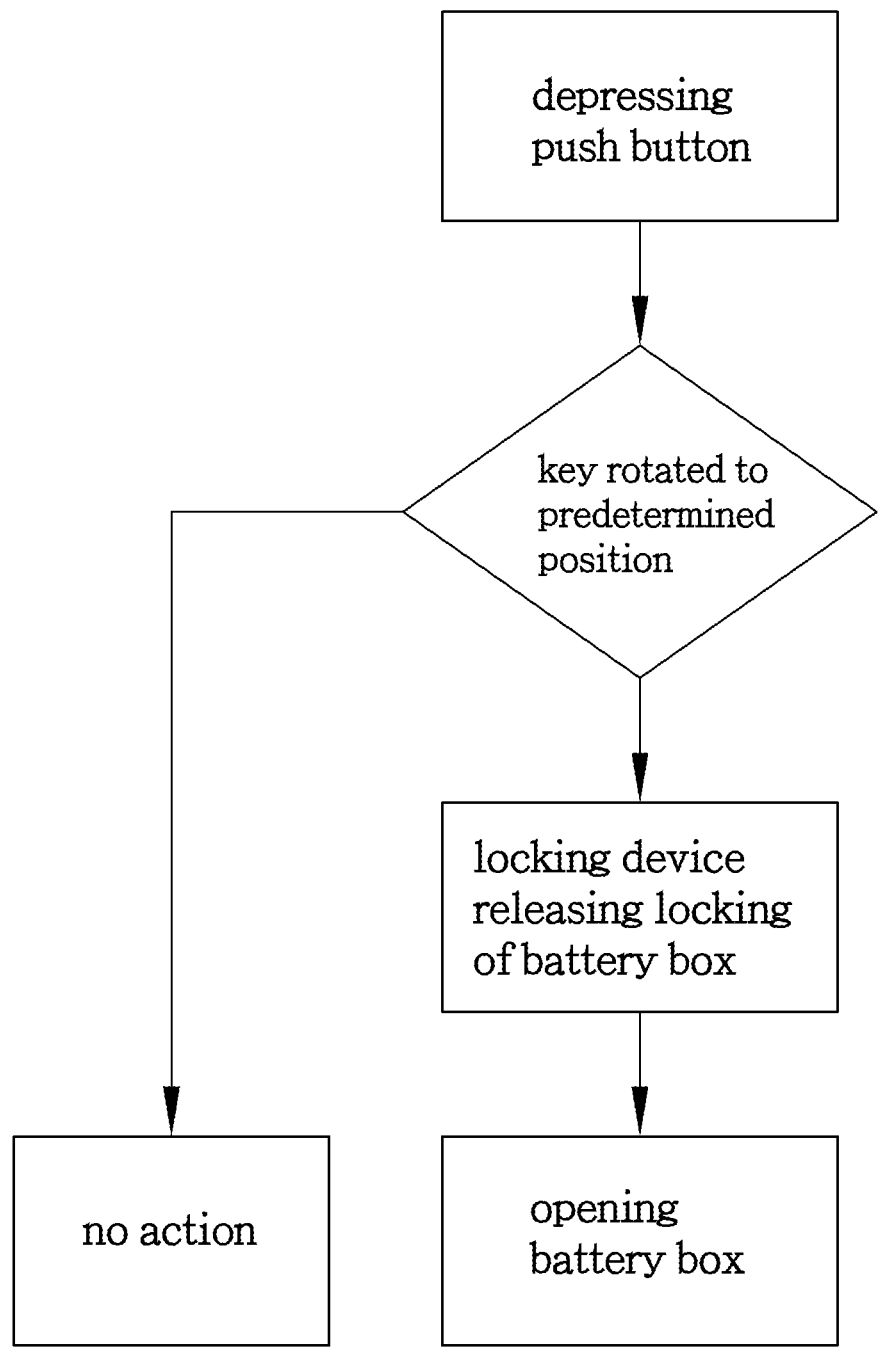
FIG. 10 is a flow chart illustrating an operation process of the second embodiment of opening the battery box of the electric vehicle according to the present invention.

As shown in FIGS. 8, 9, and 10, in another embodiment of the present invention, the operation controller C is further electrically connected with a trigger unit P. The trigger unit P is embodied as a member including for example a push button or a toggle switching member, and in the drawings, a push button is taken as an example for illustration. When the key 91 of the to-be-verified unit 9 matches the main switch lock 81 of the verifying unit 8, namely the key 91 of the to-be-verified unit 9 passes a verification test of the main switch lock 81 of the verifying unit 8, after activation of the trigger unit P, the key 91 is operate to rotate the main switch lock 81, so that when the main switch lock 81 is rotated to a predetermined location, the trigger unit P sets the operation controller C in operation to first cause the locking device 7 to release locking of storage of the battery box 5, and then causing the operation device 6 to operate for making the battery box 5 to rotate about the rotation center defined by the support shafts 51 to the open position of being generally defining a right angle with respect to the ground surface, whereby a user is allowed to readily lift and remove the battery 4 from the battery box 5.

Figure 11:
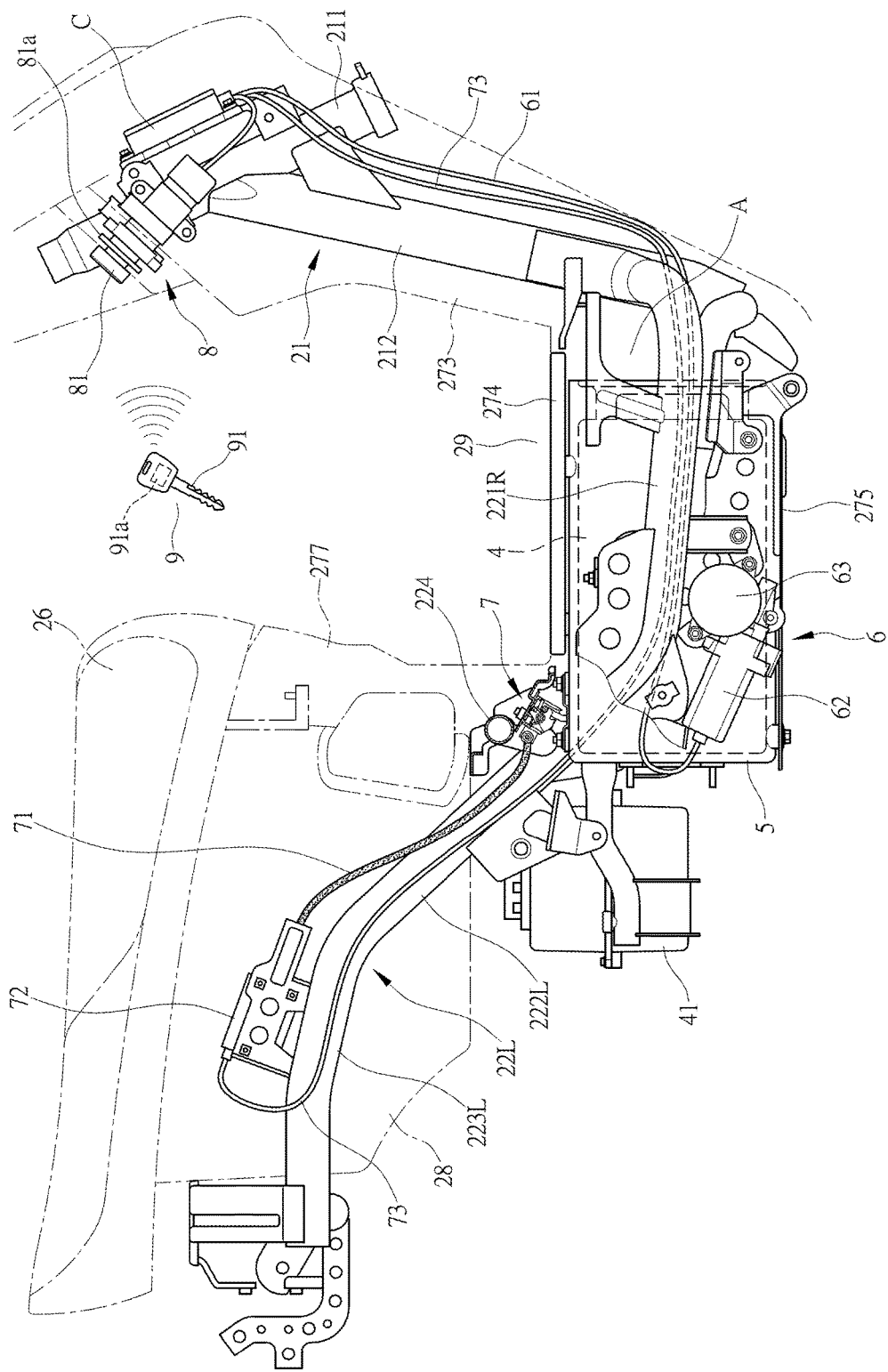
FIGS. 11 and 12 illustrate a third embodiment of opening the battery box of the electric vehicle according to the present invention.
Figure 12:
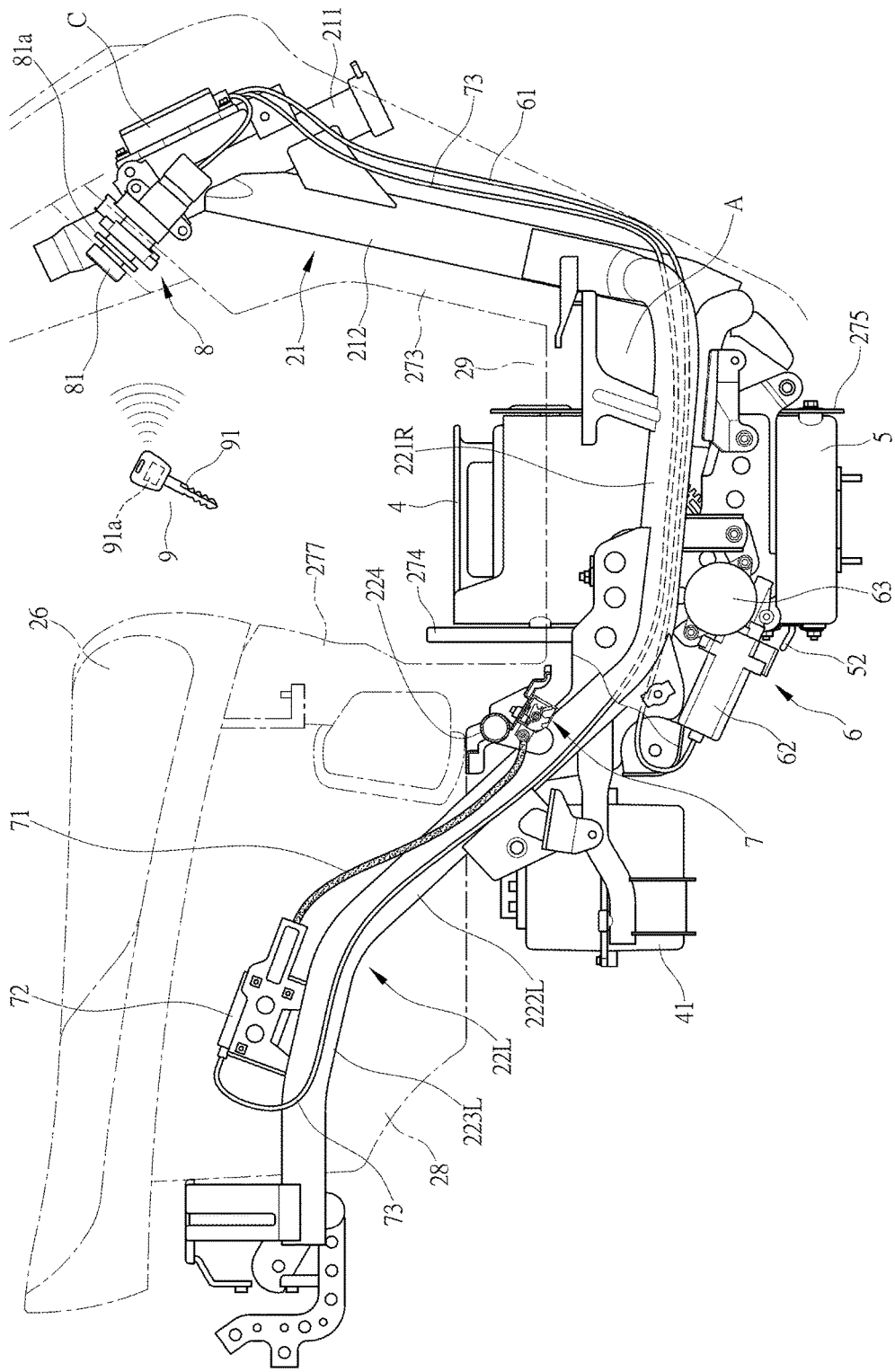

As shown in FIGS. 11 and 12, the verifying unit 8 is embodied as a main switch lock 81 that comprises a sensing device 81a and the to-be-verified unit 9 is embodied as a key 91 that comprises a sensing chip 91a. When the sensing chip 91a of the to-be-verified unit 9 approaches the sensing device 81a, the sensing device 81a senses and determines if the sensing chip 91a is a predetermined to-be-verified unit 9 matching therewith. When the determination of the sensing device 81a is positive, and the key 91 also matches the main switch lock 81 of the verifying unit 8, namely the sensing chip 91a and the key 91 of the to-be-verified unit 9 pass a verification test of the sensing device 81a and the main switch lock 81 of the verifying unit 8, the key 91 is allowed to rotate the main switch lock 81, so that the main switch lock 81 may set the operation controller C in operation to first cause the locking device 7 to release locking of storage of the battery box 5, and then causing the operation device 6 to operate for making the battery box 5 to rotate about the rotation center defined by the support shafts 51 to the open position of being generally defining a right angle with respect to the ground surface, whereby a user is allowed to readily lift and remove the battery 4 from the battery box 5.

Figure 13:
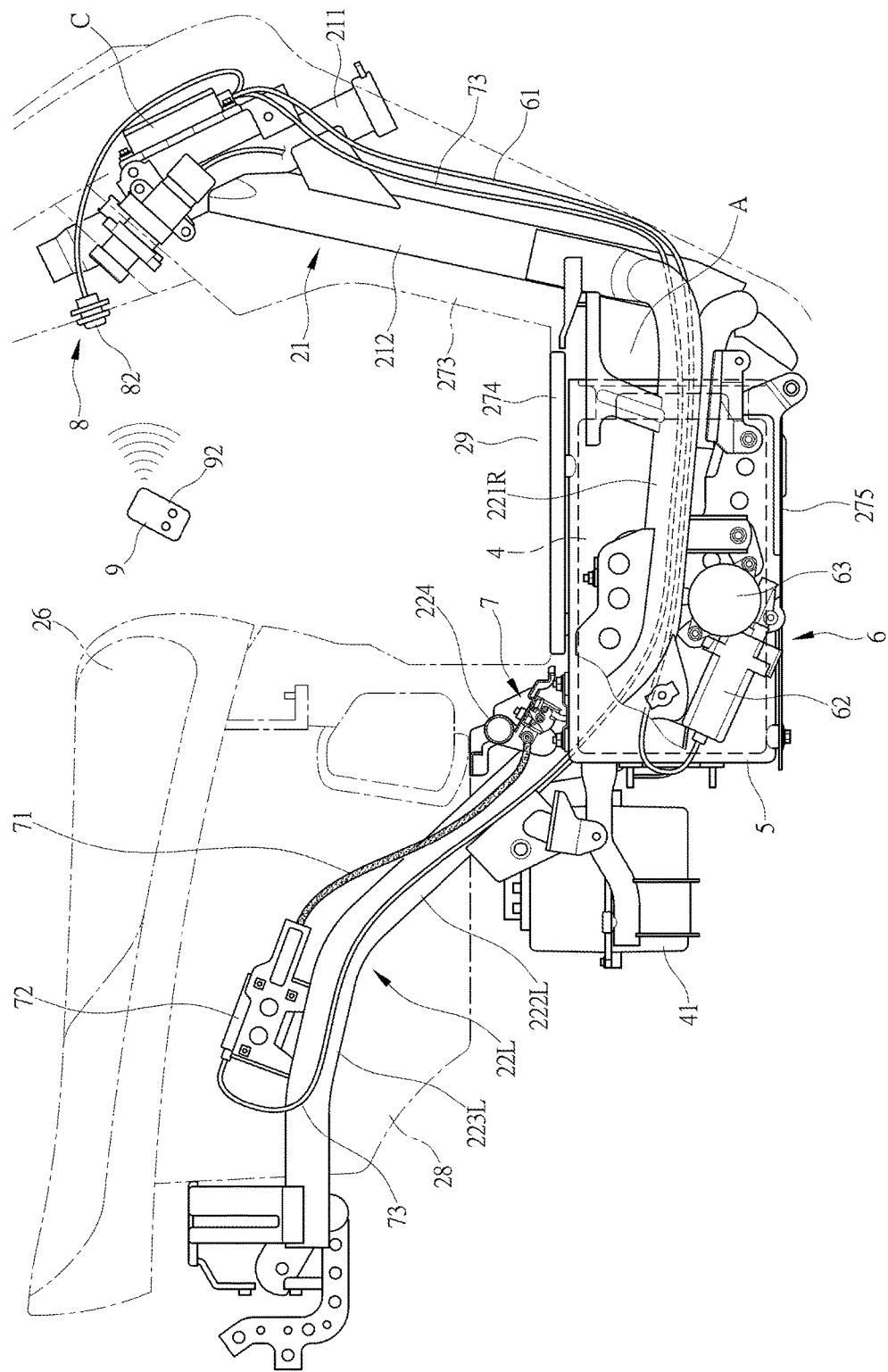
FIGS. 13 and 14 illustrate a fourth embodiment of opening the battery box of the electric vehicle according to the present invention.
Figure 14:
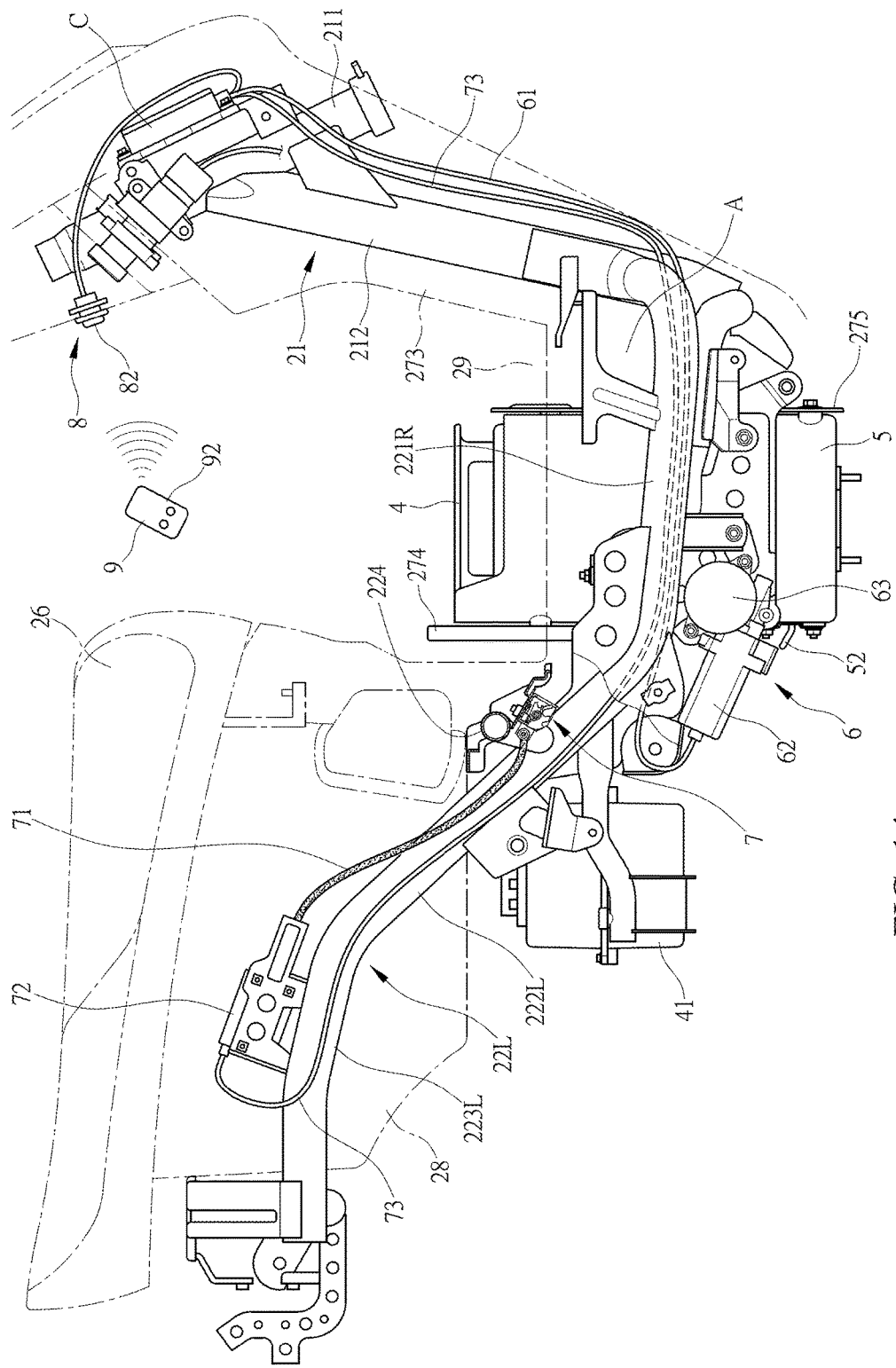
Figure 15:
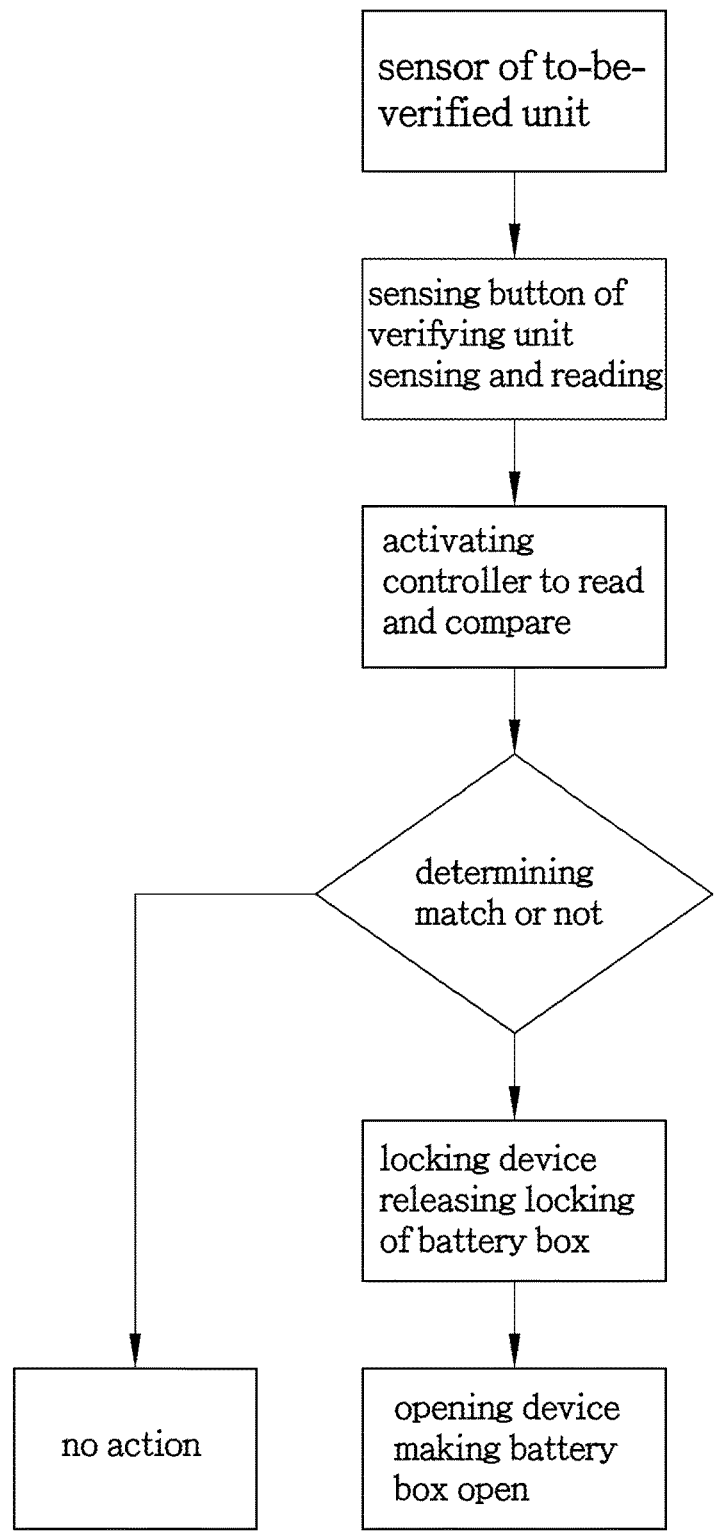
FIG. 15 is a flow chart illustrating an operation process of the fourth embodiment of opening the battery box of the electric vehicle according to the present invention.

As shown in FIGS. 13, 14, and 15, the verifying unit 8 is embodied as a sensing reader 82 and the to-be-verified unit 9 is embodied as a sensor 92. The sensor 92 can be a wireless sensor, such as a magnetic sensor, an electromagnetic wave sensor, an optic wave sensor, and a sound wave sensor. When the sensor 92 of the to-be-verified unit 9 approaches the sensing reader 82, the sensing reader 82 senses and reads a signal from the sensor 92, which is then read and compared by the operation controller C to determine if it is a predetermined to-be-verified unit 9 matching therewith. When the determination of the operation controller C is positive, namely the sensor 92 of the to-be-verified unit 9 passes a recognition and verification test of the sensing reader 82 of the verifying unit 8, the sensing reader 82 can be activated through depression to set the operation controller C in operation so that the operation controller C first causes the locking device 7 to release locking of storage of the battery box 5, and then causes the operation device 6 to operate for making the battery box 5 to rotate about the rotation center defined by the support shafts 51 to the open position of being generally defining a right angle with respect to the ground surface, whereby a user is allowed to readily lift and remove the battery 4 from the battery box 5.

Figure 16:
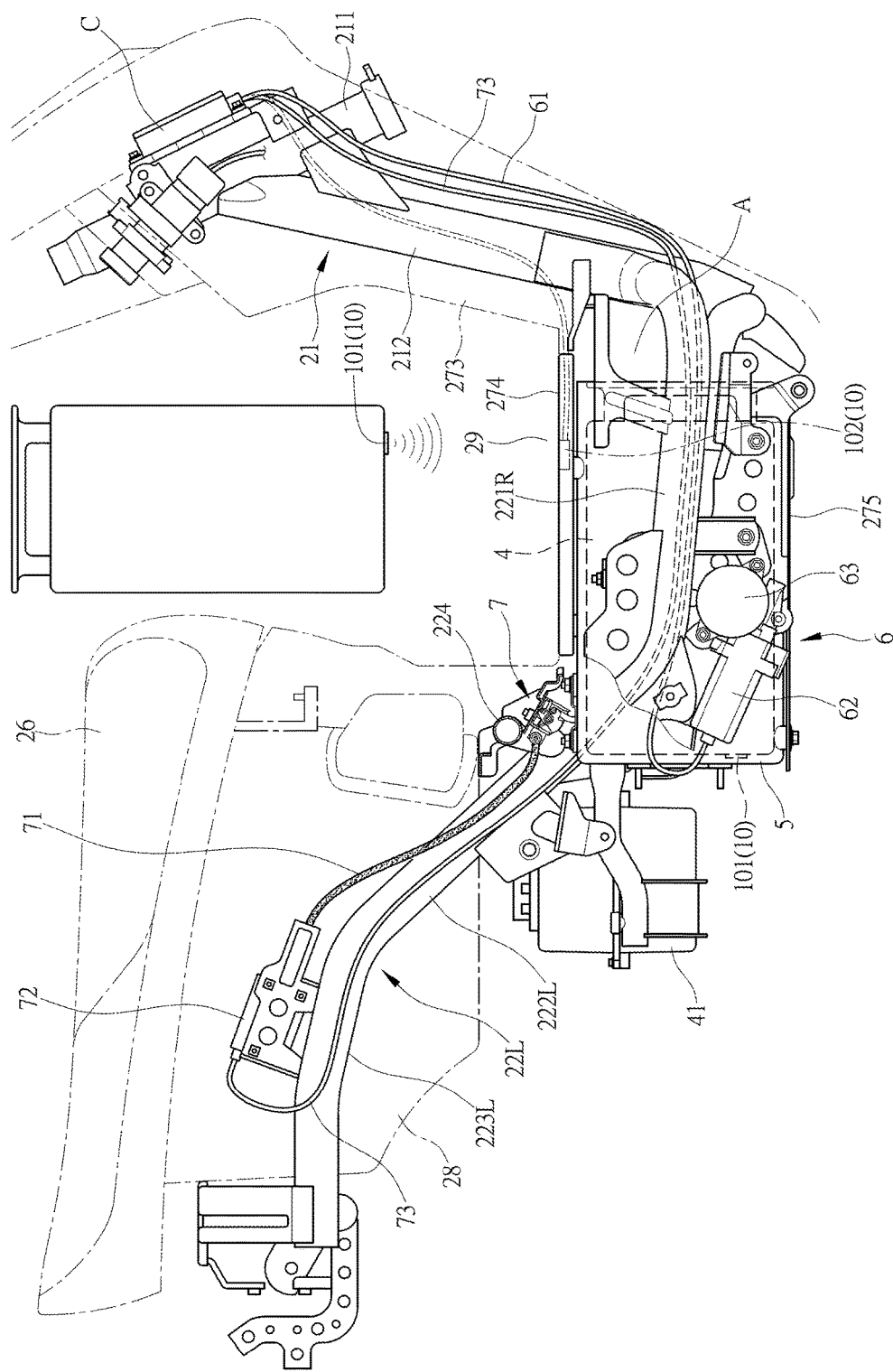
FIGS. 16 and 17 illustrate a fifth embodiment of opening the battery box of the electric vehicle according to the present invention.
Figure 17:
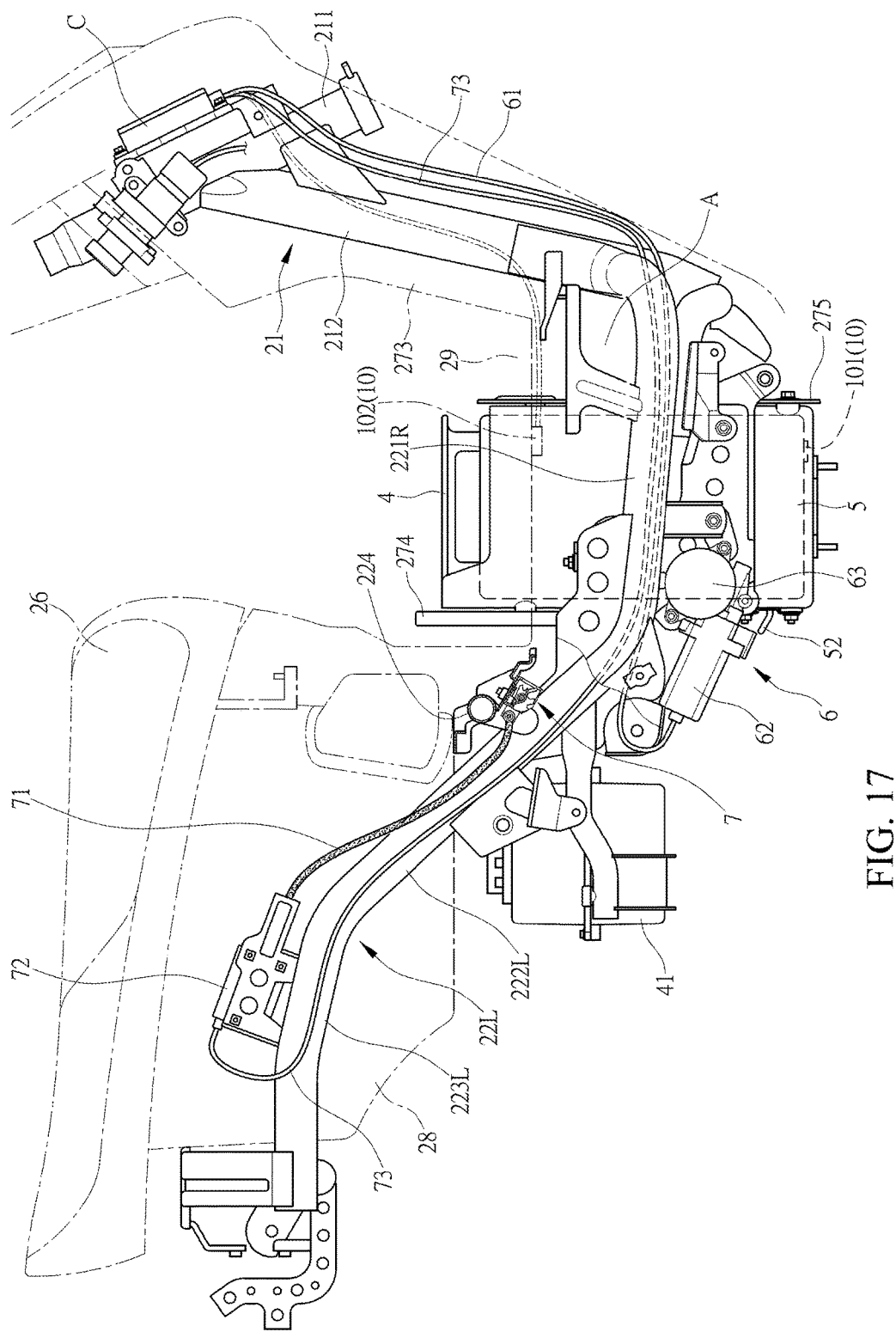

As shown in FIGS. 16 and 17, the verifying unit 8 and the to-be-verified unit 9 are embodied as a near field sensing device (near field communication, NFC) 10, wherein the near field sensing device 10 has a to-be-verified section 101 (namely the to-be-verified unit 9) that is provided on an outer surface of the battery 4, particularly a bottom surface of the battery 4. The near field sensing device 10 has a verifying section 102 (namely the verifying unit 8) that is provided on the vehicle body of the electric vehicle 2, and being arranged on the right foot tube 213 is taken as an example of illustration. When a user attempts to lift and remove the battery 4 for maintenance of charging, the user only needs to bring another battery 4 that is provided with a to-be-verified section 101 (namely a to-be-verified unit 9) of a near field sensing device 10. Since the verifying section 103 of the near field sensing device 10 is electrically connected with the operation controller C, when said another battery 4 that is provided with the to-be-verified section 101 of the near field sensing device 10 approaches the electric vehicle 2, due to the electric vehicle 2 being provided with the verifying section 102, the verifying 102 detects the battery 4 that is provided with the to-be-verified section 101 and reads a signal from the to-be-verified section 101, and carries out comparison and determination as to being a predetermined matching to-be-verified section 101 or not. When the determination of the verifying section 102 is positive, the verifying section 102 sets the operation controller C in operation so that the operation controller C first causes the locking device 7 to release locking of storage of the battery box 5, and then causes the operation device 6 to operate for making the battery box 5 to rotate about the rotation center defined by the support shafts 51 to the open position of being generally defining a right angle with respect to the ground surface, whereby a user is allowed to readily lift and remove the battery 4 from the battery box 5.

The primary efficacy of the present invention is that a battery box 5 is provided on one side thereof with an operation device 6 that is operable to set the battery box 5 at an open position and a storage position. The operation device 6 is electrically connected with an operation controller C. The operation controller C is electrically connected with a verifying unit. The verifying unit 8 is put into operation by a to-be-verified unit 9 or through sensing, so that easiness of lifting and removing a battery 5 is improved and burglarproofness of the battery 4 is enhanced.

The second efficacy of the present invention is that a frame unit 21 is provided with a locking device 7 that is operable to lock and secure storage of a battery box 5; the locking device 7 is connected by a control cable 71 to an electro-mechanical controller 72 and a signal cable 73 electrically connects the electro-mechanical controller 72 to an operation controller C, so that the operation controller C is operable to control the locking device 7 to take a locking operation or a locking release operation; and a positioning member 52 is mounted on a battery box 5 to correspond to the locking device 7 so that an effect of locking and positioning of the battery box 5 is ensured and burglarproofness of the battery 4 and controllability of the locking device 7 are enhanced.

The third efficacy of the present invention is that a to-be-verified unit 9 is made as a key 91, a key 91 with a sensing chip 91 a, or a sensor 92, so that sensing and controllability of the to-be-verified unit 9 are ensured.

The fourth efficacy of the present invention is that a verifying unit 8 is made as a main switch lock 11, a main switch lock 81 with a sensing device 81a, or a sensing reader 82, so that sensing and controllability of the verifying unit 8 are improved.

The fifth efficacy of the present invention is that an operation controller C is further electrically connected with a trigger unit P so that controllability of opening and closing of the battery box 5 is enhanced.

The sixth efficacy of the present invention is that a trigger unit P is made as a push button or a toggle switching member so that operability of the trigger unit P is improved.

The seventh efficacy of the present invention is that a sensor 92 is made as one of an electromagnetic wave sensor, an optic wave sensor, and a sound wave sensor so that operability of the sensor 92 is improved.

The eighth efficacy of the present invention is that side frame tubes 22L, 22R comprise riser frame sections 222L, 222R and rear frame sections 223L, 223R. A transverse tube 224 is provided on the riser frame sections 222L, 222R A locking device 7 is arranged on the transverse tube 224. A positioning member 52 is provided at a location closer to a rear side of a vehicle body than support shafts 51 of the battery box 5 and is located adjacent to a locking device 7 when the battery box 5 is set at a storage position and is set at a height in a condition that the battery box 5 is at an open position lower than that of the storage position so that, on the one hand, easiness of arrangement of the locking device 7 and the positioning member 52 is improved and a space of an electric vehicle 2 is fully utilized, and on the other hand, the positioning member 52 is hidden when the battery box 5 is at the open position, without interfering with the site where the battery 4 is lifted and removed from the battery box 5.

The ninth efficacy of the present invention is that an operation device 6 is electrically connected, via a signal cable 61, to an operation controller C so that controllability of the operation device 6 is improved.

The tenth efficacy of the present invention is that an operation device 6 comprises an electrically-driven motor 62 and a worm-and-worm gear based reduction mechanism 63 driven by the electrically-driven motor 62 so that controllability of the operation device 6 is improved and open and storage positions of a battery box 5 are ensured.

The eleventh efficacy of the present invention is that a verifying unit 9 and a to-be-verified unit 8 are embodied as a near field sensing device; the near field sensing device 10 comprises a verifying section 101 and a to-be-verified section 102, the to-be-verified section 101 being provided on a battery 4, the verifying section 102 being mounted on a vehicle body of an electric vehicle 2, so that an effect of locking and positioning of a battery box 5 is ensured and burglarproofness of the battery 4 and controllability of the locking device 7 are enhanced.

We claim:

1. An opening control structure of an electric vehicle battery box, wherein an electric vehicle at least comprises a frame unit and a vehicle body cover unit that covers the frame unit; the frame unit shaft-supports a battery box thereon, the battery box receiving and holding therein a battery that supplies electrical power for driving the electric vehicle, characterized in that the battery box is provided with an operation device that sets the battery box at an open position or a storage position; the operation device is electrically connected to an operation controller, the operation controller being electrically connected with a verifying unit, the verifying unit being put into operation by a to-be-verified unit or through sensing.

2. The opening control structure of the electric vehicle battery box according to claim 1, wherein the frame unit is provided with a locking device for locking and securing the battery box; the locking device is connected via a control cable to an electro-mechanical controller and an electrical signal cable electrically connects the electro-mechanical controller to the operation controller; so that the operation controller controls the locking device to carry out a locking operation or a locking release operation; and the battery box is provided with a positioning member corresponding to the locking device.

3. The opening control structure of the electric vehicle battery box according to claim 1, wherein the to-be-verified unit comprises one of a key, a key with sensing chip, and a sensor.

4. The opening control structure of the electric vehicle battery box according to claim 1, wherein the verifying unit comprises one of a main switch lock, a main switch lock with sensing device, and a sensing reader.

5. The opening control structure of the electric vehicle battery box according to claim 1, wherein the operation controller is further electrically connected with a trigger unit.

6. The opening control structure of the electric vehicle battery box according to claim 5, wherein the trigger unit comprises a push button or a toggle switching member.

7. The opening control structure of the electric vehicle battery box according to claim 3, wherein the sensor comprises at least one of an electromagnetic wave sensor, an optic wave sensor, a sound wave sensor, and a magnetic sensor.

8. The opening control structure of the electric vehicle battery box according to claim 2, wherein the frame unit comprises side frame tubes extending toward a rear side of a vehicle body, the side frame tubes comprising riser frame sections and rear frame sections, a transverse tube being provided on the riser frame sections, the locking device being arranged on the transverse tube, the positioning member being provided at a location closer to the rear side of the vehicle body than support shafts of the battery box and located adjacent to the locking device when the battery box is set at the storage position and being set at a height in a condition that the battery box is at the open position lower than that of the storage position.

9. The opening control structure of the electric vehicle battery box according to claim 1, wherein the operation device is electrically connected via an electrical signal cable to the operation controller.

10. The opening control structure of the electric vehicle battery box according to claim 1, wherein the operation device comprises an electrically-driven motor and a worm-and-worm gear based reduction mechanism driven by the electrically-driven motor.

11. The opening control structure of the electric vehicle battery box according to claim 1, wherein the verifying unit and the to-be-verified unit are a near field sensing device; and the near field sensing device comprises a to-be-verified section and a verifying section, the to-be-verified section being provided on the battery the verifying section being arranged on a vehicle body of the electric vehicle.

12. The opening control structure of the electric vehicle battery box according to claim 2, wherein the operation controller is further electrically connected with a trigger unit.

13. The opening control structure of the electric vehicle battery box according to claim 12, wherein the trigger unit comprises a push button or a toggle switching member.

14. The opening control structure of the electric vehicle battery box according to claim 9, wherein the operation device comprises an electrically-driven motor and a worm-and-worm gear based reduction mechanism driven by the electrically-driven motor.

\* \* \* \* \*